(12) United States Patent
Roth et al.

(10) Patent No.: US 6,499,116 B1
(45) Date of Patent: Dec. 24, 2002

(54) PERFORMANCE OF DATA STREAM TOUCH EVENTS

(75) Inventors: Charles Philip Roth, Austin, TX (US); Michael Dean Snyder, Austin, TX (US)

(73) Assignees: International Business Machines Corp., Armonk, NY (US); Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/282,694

(22) Filed: Mar. 31, 1999

(51) Int. Cl.[7] .............................................. G06F 11/00
(52) U.S. Cl. ......................................... 714/39; 711/146
(58) Field of Search ............................. 714/39, 41, 42, 714/44, 47; 711/113, 132, 140, 146

(56) References Cited

U.S. PATENT DOCUMENTS

| | | | |
|---|---|---|---|
| 5,367,657 A | 11/1994 | Knare et al. ................. 395/425 |
| 5,594,864 A | 1/1997 | Trauben ................. 395/183.15 |
| 5,689,670 A | 11/1997 | Luk ........................... 395/383 |
| 5,691,920 A | 11/1997 | Levine et al. .......... 364/551.01 |
| 5,727,167 A | 3/1998 | Dwyer, III et al. .......... 395/280 |
| 5,729,726 A | 3/1998 | Levine et al. .............. 395/580 |
| 5,737,747 A | 4/1998 | Vishlitzky et al. .......... 711/118 |
| 5,751,945 A | * 5/1998 | Levine et al. ................. 714/47 |
| 5,802,273 A | * 9/1998 | Levine et al. ................. 714/47 |
| 5,835,702 A | * 11/1998 | Levine et al. ................. 714/39 |
| 5,881,306 A | * 3/1999 | Levine et al. ................. 712/23 |
| 5,961,654 A | * 10/1999 | Levine et al. ................. 714/47 |
| 5,970,439 A | * 10/1999 | Levine et al. ............... 702/186 |
| 6,085,338 A | * 7/2000 | Levine et al. ................. 714/47 |
| 6,189,072 B1 | * 2/2001 | Levine et al. ............... 711/118 |

OTHER PUBLICATIONS

Tien–Fu Chen, "Reducing memory penalty by a programmable prefetch engine for on–chip caches", *Microprocessors and Microsystems* (1997), pp. 1121–130.

"Software Test Coverage Measurement", *IBM Technical Disclosure Bulletin*, Vol. 39 No. 08, Aug. 1996, pp. 223–225.

* cited by examiner

*Primary Examiner*—Nadeem Iqbal
(74) *Attorney, Agent, or Firm*—Kelly K. Kordzik; Winstead Sechrest & Minick P.C.; Robert M. Carwell

(57) ABSTRACT

Data stream touch instructions are software-directed asynchronous prefetch instructions that can improve the performance of a system. Ideally, such instructions are used in perfect synchronization with the actual memory fetches that are trying to speed up. In practical situations, it is difficult to predict ahead of time all side effects of these instructions and memory access latency/throughput during execution of any large program. Incorrect usage of such instructions can cause degraded performance of the system. Thus, it is advantageous to measure the performance of such instructions.

39 Claims, 11 Drawing Sheets

FIG. 3

| BUFFER NUMBER | INSTRUCTION TYPE / EXECUTION UNIT | #GPR DEST. | #FPR DEST. | FINISHED | EXCEPTION |
|---|---|---|---|---|---|
| 0 | 22 | 1 | 0 | 0 | 0 |
| 1 | 22 | 1 | 0 | 0 | 0 |
| 2 | | | | | |
| 3 | | | | | |
| 4 | | | | | |
| 5 | | | | | |
| 6 | | | | | |
| 7 | | | | | |
| 8 | | | | | |
| 9 | | | | | |
| 10 | | | | | |
| 11 | | | | | |
| 12 | | | | | |
| 13 | | | | | |
| 14 | | | | | |
| 15 | | | | | |

↑ COMPLETION 75
↑ ALLOCATION 73

| BITS 0-4 COUNTING ENABLES | BIT 5 INTERRUPT ENABLES | BITS 6-15 | BIT 16 PMC1 INTERRUPT CONTROL | BIT 17 PMCn, n>1 COUNT CONTROL | BIT 18 PMCn, n>1 COUNT CONTROL | BITS 19-25 PMC1 EVENT SELECTION | BITS 26-31 PMC2 EVENT SELECTION |
|---|---|---|---|---|---|---|---|

MMCR0

FIG. 6B

| BITS 0-4 PMC3 EVENT SELECTION | BITS 5-9 PMC4 EVENT SELECTION | BITS 10-14 PMC5 EVENT SELECTION | BITS 15-19 PMC6 EVENT SELECTION | BITS 20-24 PMC7 EVENT SELECTION | BITS 25-28 PMC8 EVENT SELECTION | BIT 29 FCUIABR | BIT 30 UPDATING MODE PMC1 | BIT 31 UPDATING MODE PMCn, n>1 |
|---|---|---|---|---|---|---|---|---|

MMCR1

FIG. 8
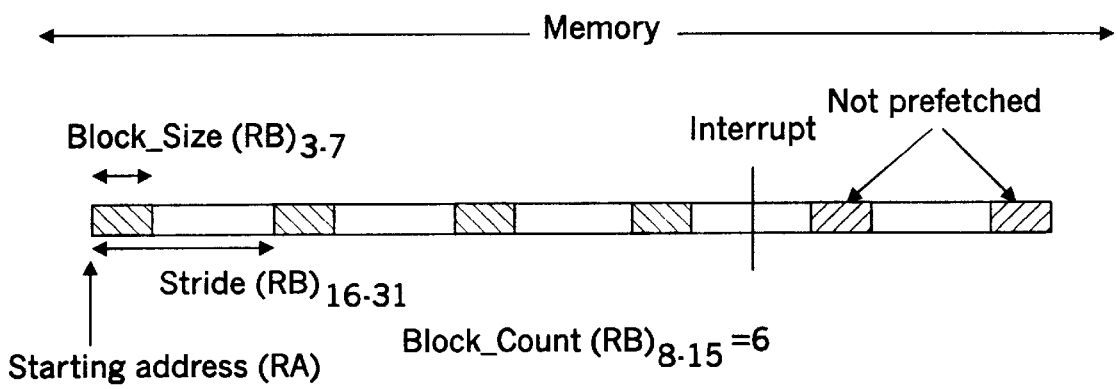
FIG. 9
| /// | Block_Size | Block_Count | Signed Block_Stride |
|---|---|---|---|
| 0 | 3 | 8 | 16 |
FIG. 10
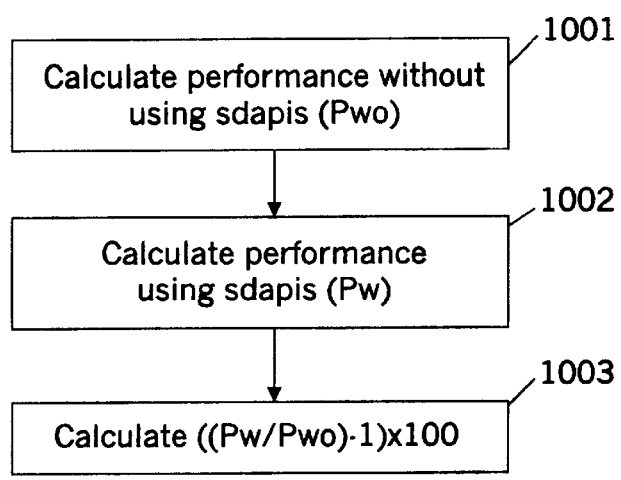

PERFORMANCE OF DATA STREAM TOUCH EVENTS

TECHNICAL FIELD

The present invention relates in general to data processing systems, and in particular, to performance monitoring of events in data processing systems.

BACKGROUND INFORMATION

In typical computer systems utilizing processors, system developers desire optimization of execution software for more effective system design. Usually, studies of a program's access patterns to memory and interaction with a system's memory hierarchy are performed to determine system efficiency. Understanding the memory hierarchy behavior aids in developing algorithms that schedule and/or partition tasks, as well as distribute and structure data for optimizing the system.

Performance monitoring is often used in optimizing the use of software in a system. A performance monitor is generally regarded as a facility incorporated into a processor to monitor selected characteristics to assist in the debugging and analyzing of systems by determining a machine's state at a particular point in time. Often, the performance monitor produces information relating to the utilization of a processor's instruction execution and storage control. For example, the performance monitor can be utilized to provide information regarding the amount of time that has passed between events in a processing system. The information produced usually guides system architects toward ways of enhancing performance of a given system or of developing improvements in the design of a new system.

SUMMARY OF THE INVENTION

The present invention provides a representation of the use of software-directed asynchronous prefetch instructions that occur during execution of a program within a processing system. Ideally, the instructions are used in perfect synchronization with the actual memory fetches that they are trying to speed up. In practical situations, it is difficult to predict ahead of time all side effects of these instructions and memory access latencies/throughput during the execution of any large program. Incorrect usage of such software-directed asynchronous prefetch instructions can cause degraded performance of the system.

Understanding the efficient use of these instructions is not enough in itself to solve all memory access performance problems. It is necessary to identify the most prevalent causes for limitations in the memory subsystem bandwidth. Then, the most appropriate solutions to increase memory bandwidth can be determined.

The present invention concerns the measuring of the effectiveness of such software-directed asynchronous prefetch instructions ("sdapis"). The sdapis are used in a context such as video streaming. Prefetching data in this context is unlike that of prefetching instructions based on an instruction sequence or branch instruction history. It is assumed in the video streaming context that data location is virtually unknowable without software direction. One consequence, then, is that it is a reasonable assumption that virtually every software-directed prefetch results in a cache hit, which would not be a hit in the absence of the software-directed prefetch.

Assume that a program, or a simulation of a program, is running with sdapis (program execution without sdapis is expected to be slower). The number of clock cycles for running the program is counted. In a first aspect, the invention deduces that performance is improved, compared to not running sdapis, according to the reduction in memory access misses, i.e., increase in cache hits, wherein it is assumed that each instance of sdapis causes a cache hit that otherwise would have been a cache miss. In terms of cycles, this is expressed as average cache miss penalties cycles times the number of cache misses avoided (i.e., increase in cache hits). Another aspect, concerns measuring well-timed sdapis and poorly-timed sdapis. The extent of well-timed and poorly-timed sdapis is deduced by counting certain events, as described herein, that concern instances where sdapis result in loading data and the data is not used at all, or not used soon enough to avoid being cast out, and measuring certain time intervals in the case of instances where sdapis result in loading data and the data is used. Another aspect concerns measuring an extent to which sdapis impede certain memory management functions. This extent is deduced by counting certain disclosed events involving tablewalks and translation lookaside buffer castouts. Another aspect concerns measuring an extent to which sdapis are contemplated, but stopped. Events concerning cancellations and suspensions are disclosed. In another aspect, the above measurements are included in numerous streams.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which:

FIG. 3 is a conceptual illustration of a reorder buffer of the sequencer unit of FIG. 2;

FIG. 8 illustrates a data stream touch instruction;

FIG. 9 illustrates a format of a data stream touch;

FIG. 10 illustrates a process for evaluating an improvement in performance of the software due to sdapis;

DETAILED DESCRIPTION

Figure 1:
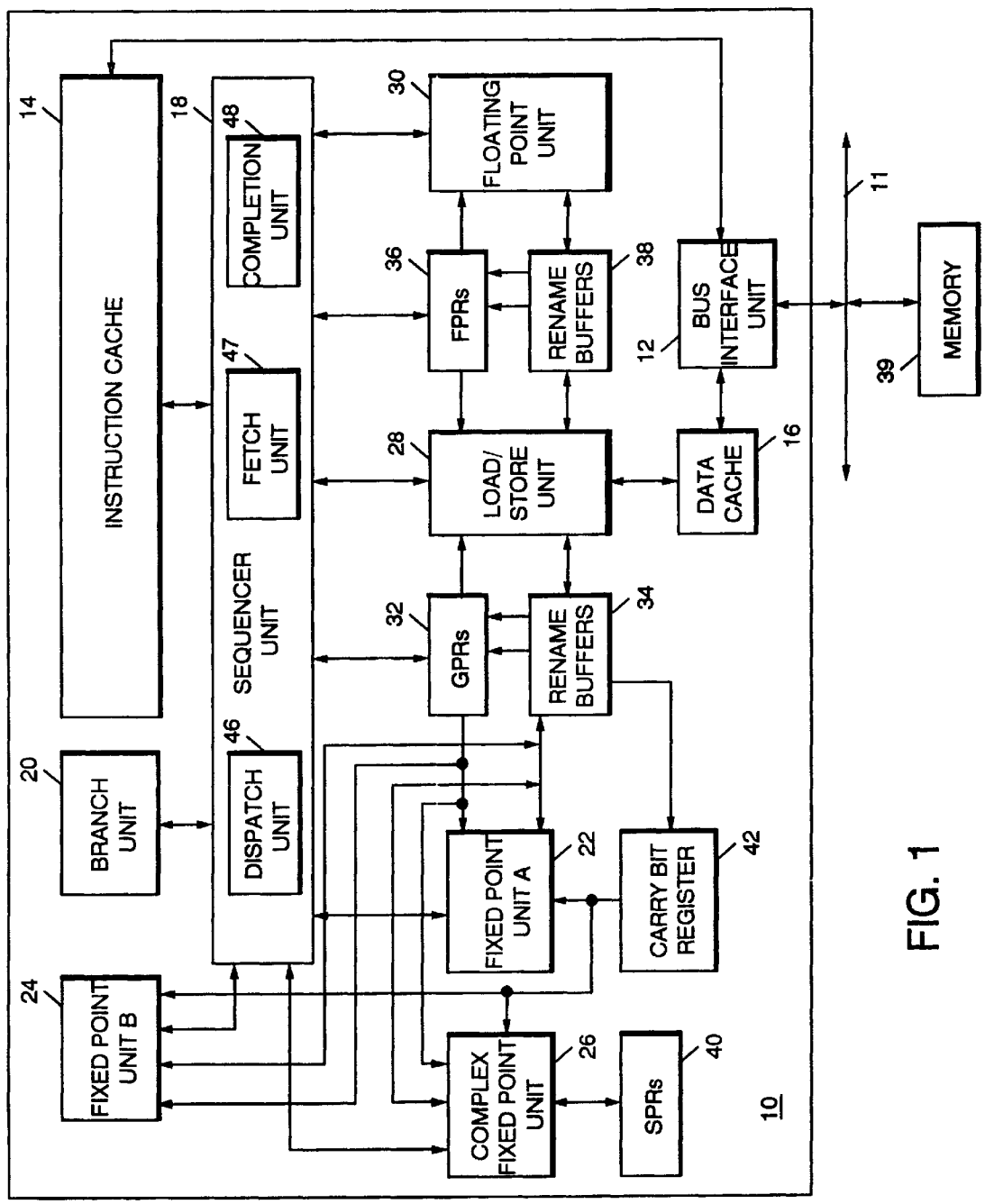
FIG. 1 is a block diagram of a processor for processing information in accordance with the present invention.

In the following description, numerous specific details are set forth such as specific word or byte lengths, etc., to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 is a block diagram of a processor 10 system for processing information according to one embodiment. Processor 10 is a single integrated circuit superscalar microprocessor. Accordingly, as discussed further hereinbelow, processor 10 includes various units, registers, buffers, memories, and other sections, all of which are formed by integrated circuitry. Processor 10 operates according to reduced instruction set computing ("RISC") techniques. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18 which includes execution units of a dispatch unit 46, a fetch unit 47, and a completion unit 48, the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26 and LSU 28 input their source operand information from general purpose architectural registers ("GPRs") 32 and fixed point rename buffers 34. Moreover, FXUA 22 and FXUB 24 input a "carry bit" from a carry bit ("CA") register 42.

FXUA 22, FXUB 24, CFXU 26 and LSU 28 output results (destination operand information) of their operations for storage at selected entries in fixed point rename buffers 34. Also, CFXU 26 inputs and outputs source operand information and destination operand information to and from special purpose registers ("SPRs") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

In response to a Load instruction, LSU 28 inputs information from data cache 16 and copies such information to selected ones of rename buffers 34 and 38. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, LSU 28 inputs information from a selected one of GPRs 32 and FPRs 36 and copies such information to data cache 16.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11.

In response to the instructions input from instruction cache 14, sequencer unit 18 selectively dispatches through a dispatch unit 46 the instructions to selected ones of execution units 20, 22, 24, 26, 28 and 30. Each execution unit executes one or more instructions of a particular class of instructions.

Processor 10 achieves high performance by processing multiple instructions simultaneously at various ones of execution units 20, 22, 24, 26, 28 and 30. Accordingly, each instruction is processed as a sequence of stages, each being executable in parallel with stages of other instructions. Such a technique is called "superscalar pipelining". An instruction is normally processed as six stages, namely fetch, decode, dispatch, execute, completion, and writeback.

In the fetch stage, sequencer unit 18 (fetch unit 47) selectively inputs (from instructions cache 14) one or more instructions from one or more memory addresses storing the sequence of instructions discussed further hereinabove in connection with branch unit 20 and sequencer unit 18.

In the decode stage, sequencer unit 18 decodes up to four fetched instructions.

In the dispatch stage, sequencer unit 18 selectively dispatches up to four decoded instructions to selected (in response to the decoding in the decode stage) ones of execution units 20, 22, 24, 26, 28 and 30 after reserving a rename buffer entry for each dispatched instruction's result (destination operand information) through a dispatch unit 46. In the dispatch stage, operand information is supplied to the selected execution units for dispatched instructions. Processor 10 dispatches instructions in order of their programmed sequence.

In the execute stage, execution units execute their dispatched instructions and output results (destination operand information) of their operations for storage at selected entries in rename buffers 34 and rename buffers 38 as discussed further hereinabove. In this manner, processor 10 is able to execute instructions out of order relative to their programmed sequence.

In the completion stage, sequencer unit 18 indicates an instruction is "complete".

Processor 10 "completes" instructions in order of their programmed sequence.

In the writeback stage, sequencer 18 directs the copying of information from rename buffers 34 and 38 to GPRs 32 and FPRs 36, respectively. Sequencer unit 18 directs such copying of information stored at a selected rename buffer.

Likewise, in the writeback stage of a particular instruction, processor 10 updates its architectural states in response to the particular instruction. Processor 10 processes the respective "writeback" stages of instructions in order of their programmed sequence. Processor 10 advantageously merges an instruction's completion stage and writeback stage in specified situations.

Figure 2:
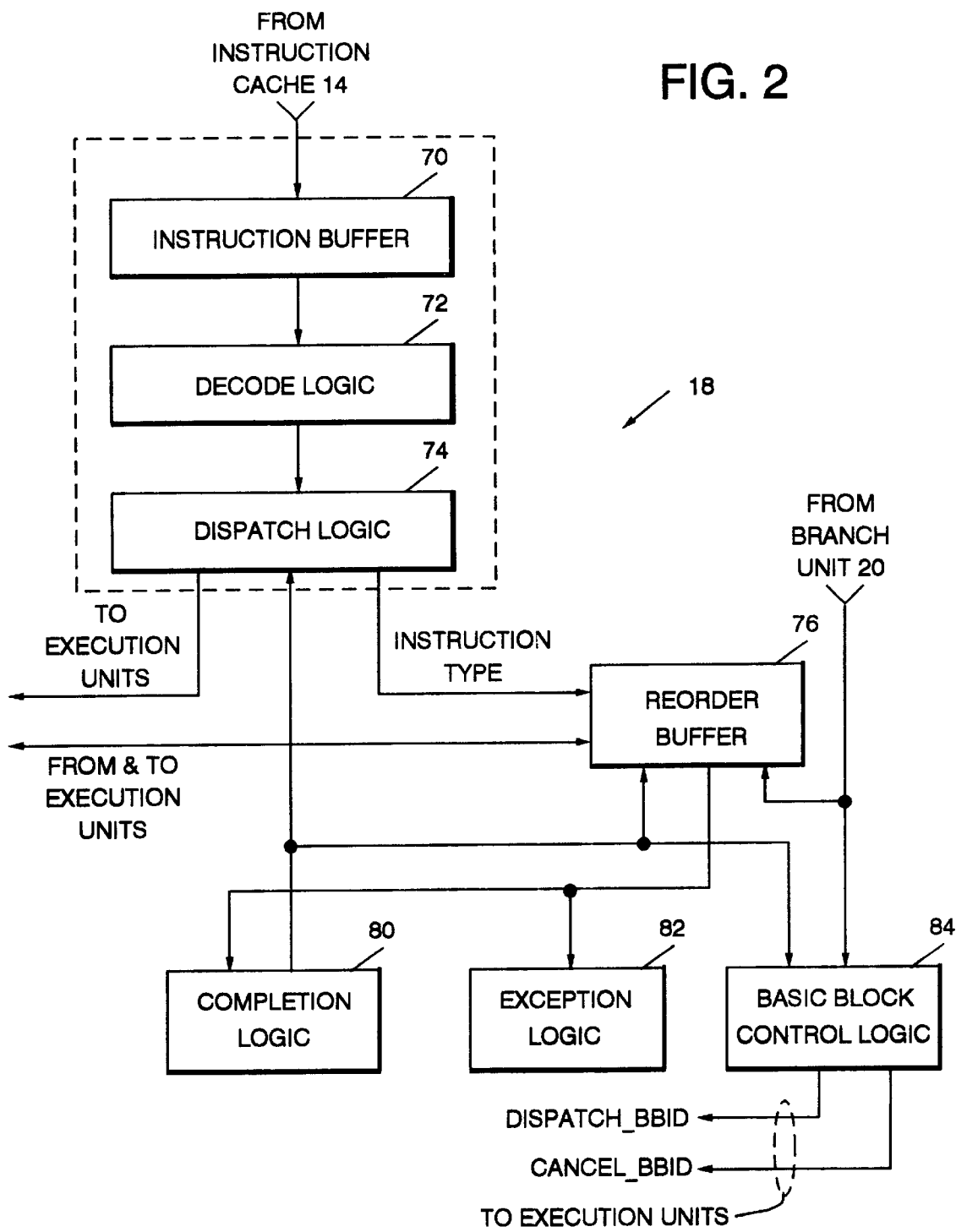
FIG. 2 is a block diagram of a sequencer unit of the processor of FIG. 1.

FIG. 2 is a block diagram of sequencer unit 18. As discussed further hereinabove, in the fetch stage, sequencer unit 18 selectively inputs up to four instructions from instructions cache 14 and stores such instructions in an instruction buffer 70. In the decode stage, decode logic 72 inputs and decodes up to four fetched instructions from instruction buffer 70. In the dispatch stage, dispatch logic 74 selectively dispatches up to four decoded instructions to selected (in response to the decoding in the decode stage) ones of execution units 20, 22, 24, 26, 28 and 30.

FIG. 3 is a conceptual illustration of a reorder buffer 76 of sequencer unit 18.

As shown in FIG. 3, reorder buffer 76 has sixteen entries respectively labeled as buffer numbers 0–15. Each entry has five primary fields, namely an "instruction type" field, a "number-of-GPR destinations" field, a "number-of-FPR destinations" field, a "finished" field, and an "exception" field.

Referring also to FIG. 2, as dispatch logic 74 dispatches an instruction to an execution unit, sequencer unit 18 assigns the dispatched instruction to an associated entry in reorder buffer 76. Sequencer unit 18 assigns (or "associates") entries in reorder buffer 76 to dispatched instructions on a first-in first-out basis and in a rotating manner, such that sequencer unit 18 assigns entry 0, followed sequentially by entries 1–15, and then entry 0 again. As the dispatched instruction is assigned an associated entry in reorder buffer 76, dispatch logic 74 outputs information concerning the dispatched instruction for storage in the various fields and subfields of the associated entry in reorder buffer 76.

FIG. 3 shows an allocation pointer 73 and a completion pointer 75. Processor 10 maintains such pointers for controlling reading from and writing to reorder buffer 76.

Processor 10 maintains allocation pointer 73 to indicate whether a reorder buffer entry is allocated to (or "associated with") a particular instruction. As shown in FIG. 3, allocation pointer 73 points to reorder buffer entry 3, thereby indicating that reorder buffer entry 3 is the next reorder buffer entry available for allocation to an instruction.

Figure 4:
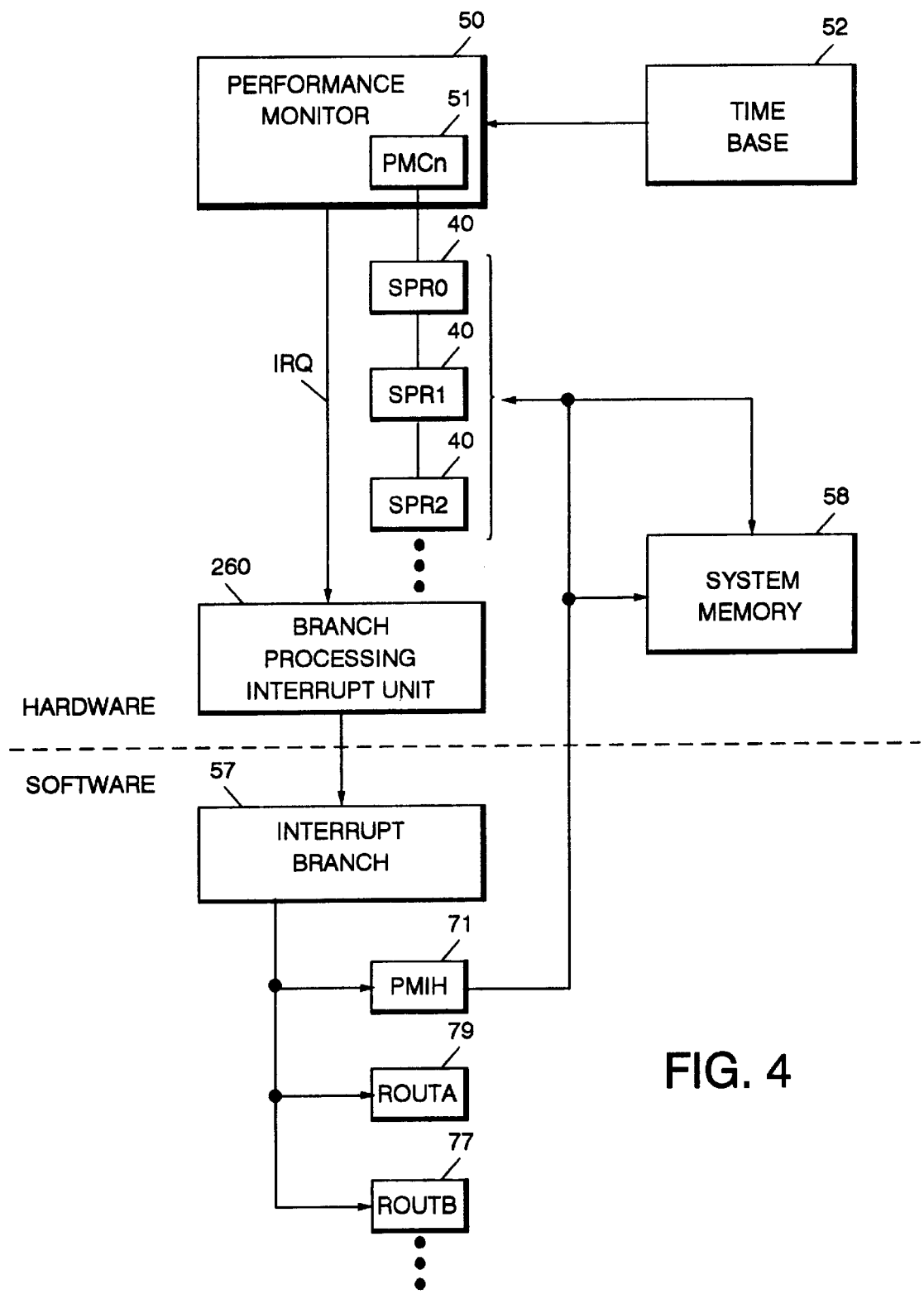
FIG. 4 is a block diagram of a performance monitoring aspect of the present invention.
Figures 7, 7B:
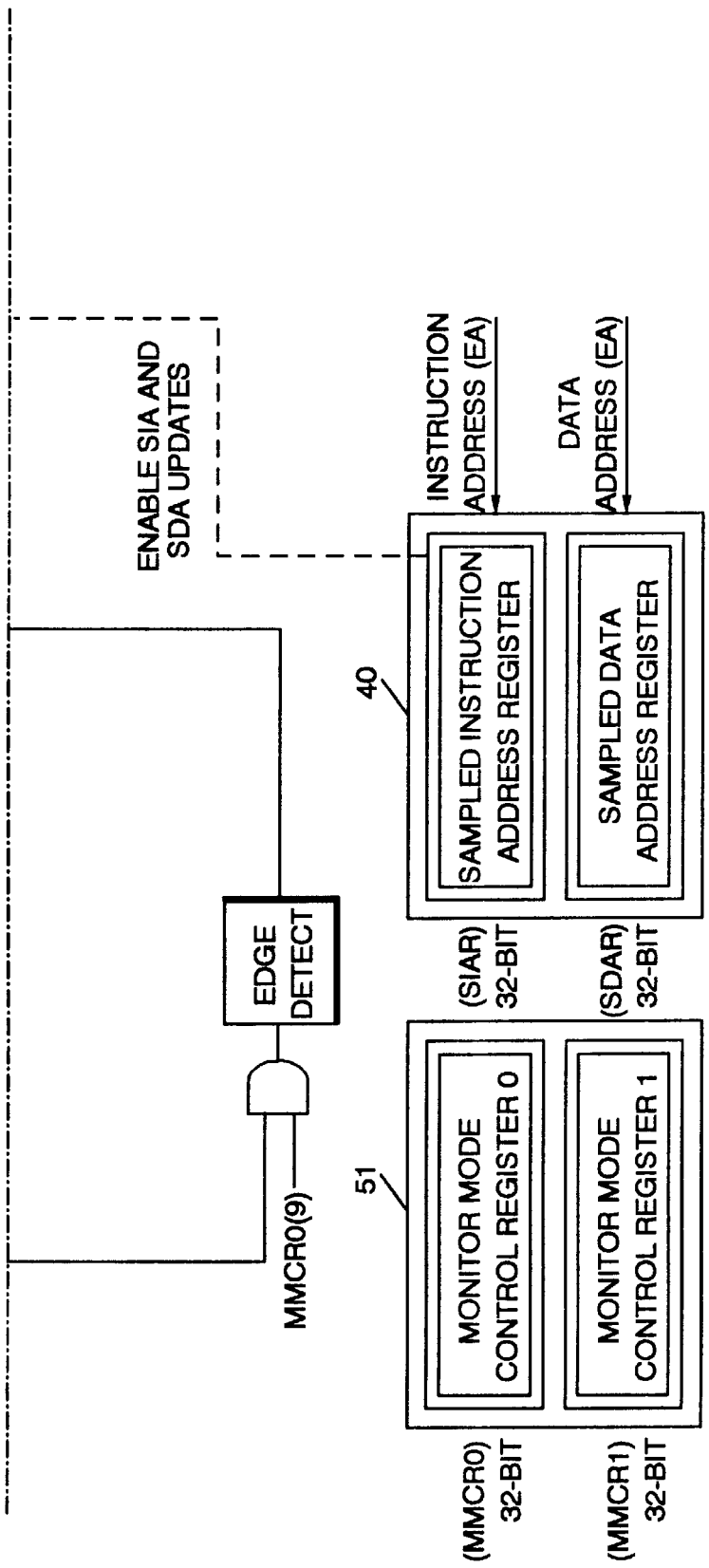
FIG. 7 illustrates a block diagram of a performance monitor configured in accordance with the present invention.
Figure 11:
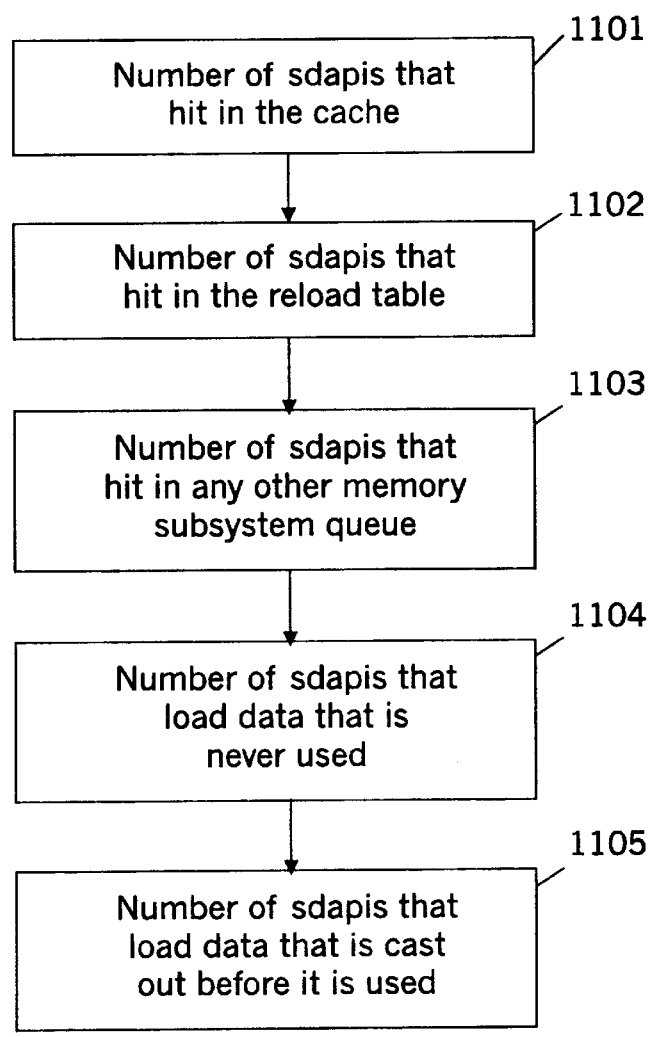
FIG. 11 illustrates a process for evaluating mistimed sdapis.
Figure 12:
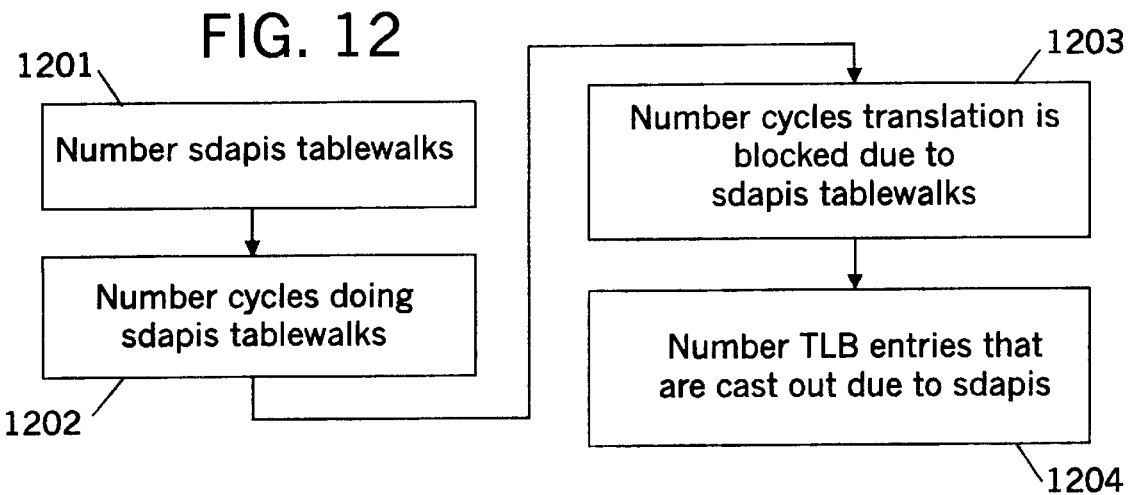
FIG. 12 illustrates a process for evaluating the effect of sdapis on memory management.
Figure 13:
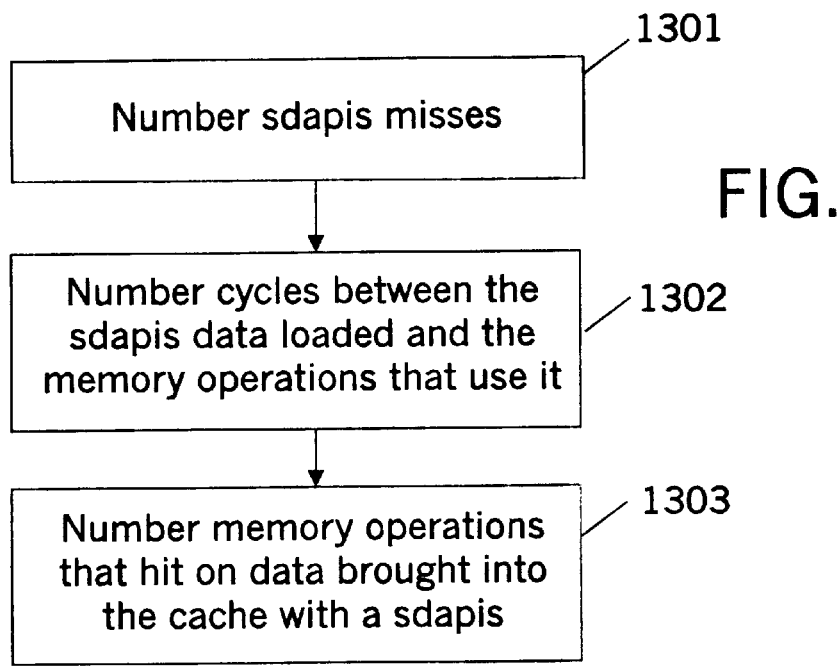
FIG. 13 illustrates a process for evaluating well-timed sdapis.
Figure 14:
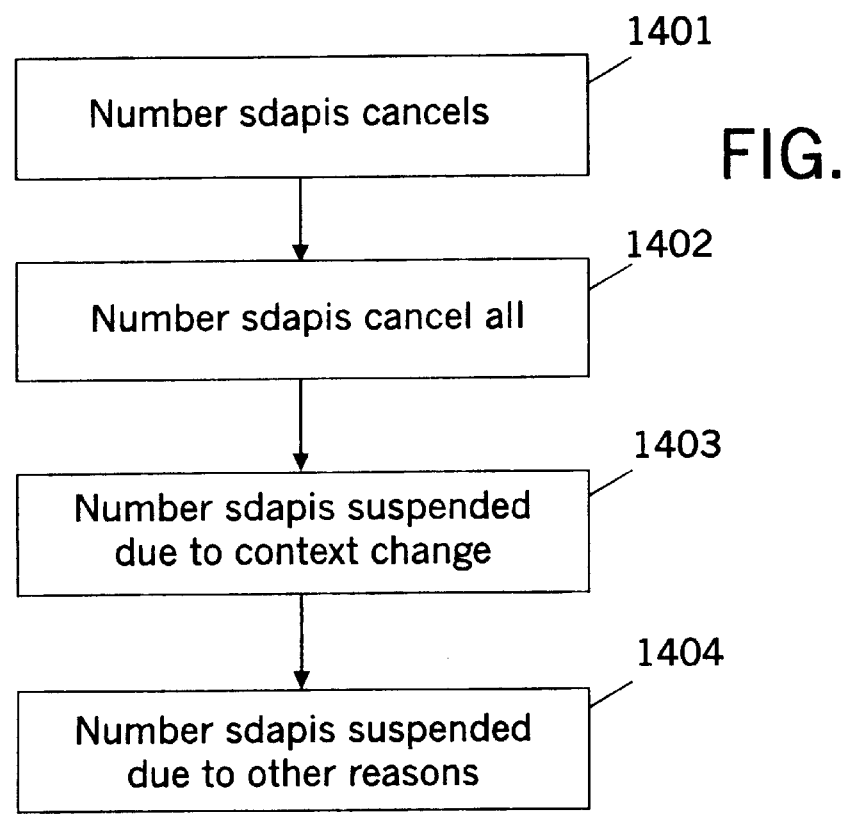
FIG. 14 illustrates a process for evaluating canceled sdapis.

Referring to FIGS. 4 and 7, a feature of processor 10 is performance monitor (PM) 50. Performance monitor 50 is a software-accessible mechanism intended to provide detailed information with significant granularity concerning the utilization of PowerPC instruction execution and storage control. Generally, the performance monitor 50 includes an implementation-dependent number (e.g., 2–8) of counters 51, e.g, PMC1–PMC8, used to count processor/storage related events. Further included in performance monitor 50 are monitor mode control registers (MMCRn) that establish the function of the counters PMCn, with each MMCR usually controlling some number of counters. Counters PMCn and registers MMCRn are typically special purpose registers physically residing on the processor 10, e.g., a PowerPC. These special purpose registers are accessible for read or write via mfspr (move from special purpose register) and mtspr (move to special purpose register) instructions, where the writing operation is allowed in a privileged or supervisor state, while reading is allowed in a problem state since reading the special purpose registers does not change the register's content. In a different embodiment, these registers may be accessible by other means such as addresses in I/O space.

The MMCRn registers are partitioned into bit fields that allow for event/signal selection to be recorded/counted. Selection of an allowable combination of events causes the counters to operate concurrently.

The MMCRn registers include controls, such as counter enable control, counter negative interrupt controls, counter event selection, and counter freeze controls, with an implementation-dependent number of events that are selectable for counting. Smaller or larger counters and registers may be utilized to correspond to a particular processor and bus architecture or an intended application, so that a different number of special purpose registers for MMCRn and PMCn may be utilized without departing from the spirit and scope of the present invention.

The performance monitor 50 is provided in conjunction with a time base facility 52 which includes a counter that designates a precise point in time for saving the machine state. The time base facility 52 includes a clock with a frequency that is typically based upon the system bus clock and is a required feature of a superscalar processor system including multiple processors 10 to provide a synchronized time base. The time base clock frequency is provided at the frequency of the system bus clock or some fraction, e.g., ¼, of the system bus clock.

Predetermined bits within a 64-bit counter included in the time base facility 52 are selected for monitoring such that the increment of time between monitored bit flips can be controlled. Synchronization of the time base facility 52 allows all processors in a multiprocessor system to initiate operation in synchronization.

Time base facility 52 further provides a method of tracking events occurring simultaneously on each processor of a multiprocessor system. Since the time base facility 52 provides a simple method for synchronizing the processors, all of the processors of a multiprocessor system detect and react to a selected single system-wide event in a synchronous manner. The transition of any bit or a selected one of a group of bits may be used for counting a condition among multiple processors simultaneously such that an interrupt is signaled when a bit flips or when a counted number of events has occurred.

In operation, a notification signal is sent to PM 50 from time base facility 52 when a predetermined bit is flipped. The PM 50 then saves the machine state values in special purpose registers. In a different scenario, the PM 50 uses a "performance monitor" interrupt signaled by a negative counter (bit zero on) condition. The act of presenting the state information including operand and address data may be delayed if one of the processors has disabled interrupt handling.

In order to ensure that there is no loss of data due to interrupt masking, when the interrupt condition is signaled, the processors capture the effective instruction and operand (if any) addresses of "an" instruction in execution and present an interrupt to the interrupt resolution logic 57, which employs various interrupt handling routines 71, 77, 79. These addresses are saved in registers, Saved Data Address (SDAR) and Saved Instruction Address (SIAR), which are designated for these purposes at the time of the system-wide signaling. The state of various execution units are also saved. This state of various execution units at the time the interrupt is signaled is provided in a saved state register (SSR). This SSR could be an internal register or a software accessible SPR. Thus, when the interrupt is actually serviced, the content of these registers provide the information concerning current instructions that are currently executing in the processor at the time of the signaling.

When the PM 50 receives the notification from time base 52 to indicate that it should record "sample data", an interrupt signal is output to a branch processing unit 20. Concurrently, the sample data (machine state data) is placed in SPRs 40 including the SIAR, SDAR and SSR which are suitably provided as registers or addresses in I/O space.

A flag may be used to indicate interrupt signaling according to a chosen bit transition as defined in the MMCRn. Of course, the actual implementation of the time base facility 52 and the selected bits is a function of the system and processor implementation.

Figure 5:
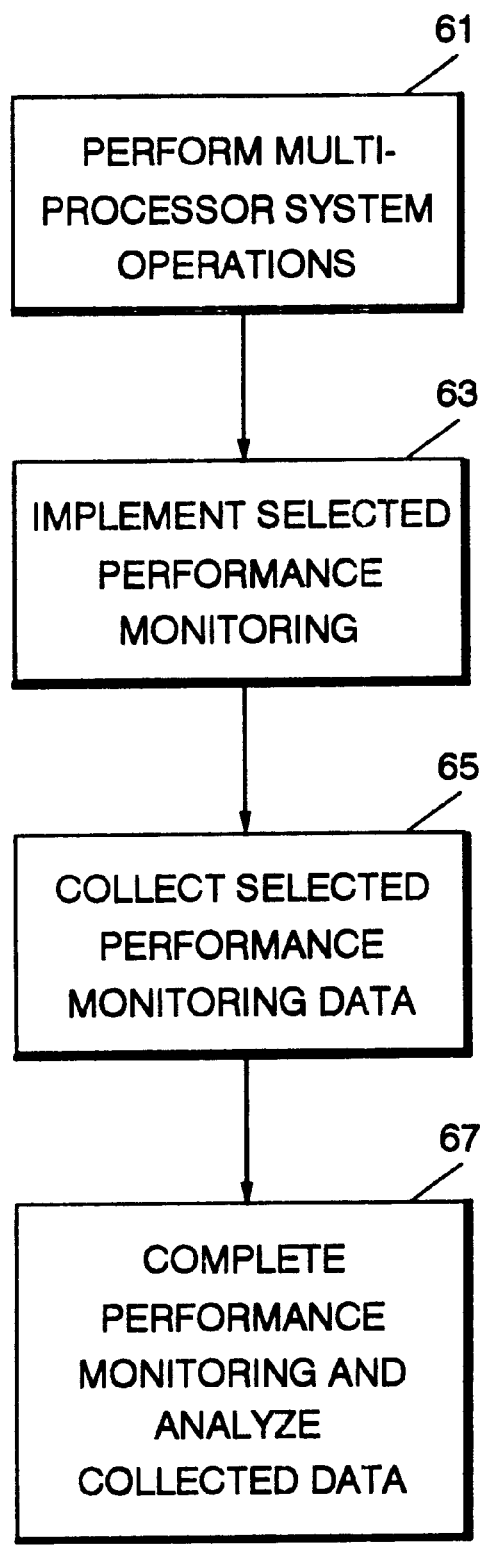
FIG. 5 is a block diagram of an overall process flow in accordance with the present invention of processing system operation including performance monitoring.

A block diagram, as shown in FIG. 5, illustrates an overall process flow in accordance with the present invention of superscalar processor system operation including performance monitoring. The process begins in block 61 with the processing of instructions within the superscalar processor system. During the superscalar processor system operation, performance monitoring is implemented in a selected manner via block 63 through configuration of the performance monitor counters by the monitor mode control registers and performance monitoring data is collected via block 65.

By adjusting the values of the performance monitor counts, that is by setting the values of the counters high enough so that an exception is signaled by some predetermined number of occurrences of an event, a profile of system performance can be obtained. Further, for purposes of this disclosure, a performance monitoring interrupt preferably occurs at a selectable point in the processing. As described in more detail below, a predetermined number of events is suitably used to select the stop point. For example, counting can be programmed to end after two instructions by causing the counter to go negative after the completion of two instructions. Further, for purposes of this disclosure, the time period during which monitoring occurs is known. Thus, the data collected has a context in terms of the number of minutes, hours, days, etc. over which the monitoring is performed.

The selected performance monitoring routine is completed and the collected data is analyzed via block 67 to identify potential areas of system enhancements. A profiling mechanism, such as a histogram, may be constructed with the data gathered to identify particular areas in the software or hardware where performance may be improved. Further, for those events being monitored that are time sensitive, e.g., a number of stalls, idles, etc., the count number data is collected over a known number of elapsed cycles so that the data has a context in terms of a sampling period. It should be appreciated that analysis of collected data may be facilitated using such tools as "aixtrace" or a graphical performance visualization tool "pv", each of which is available from IBM Corporation.

Figure 6:
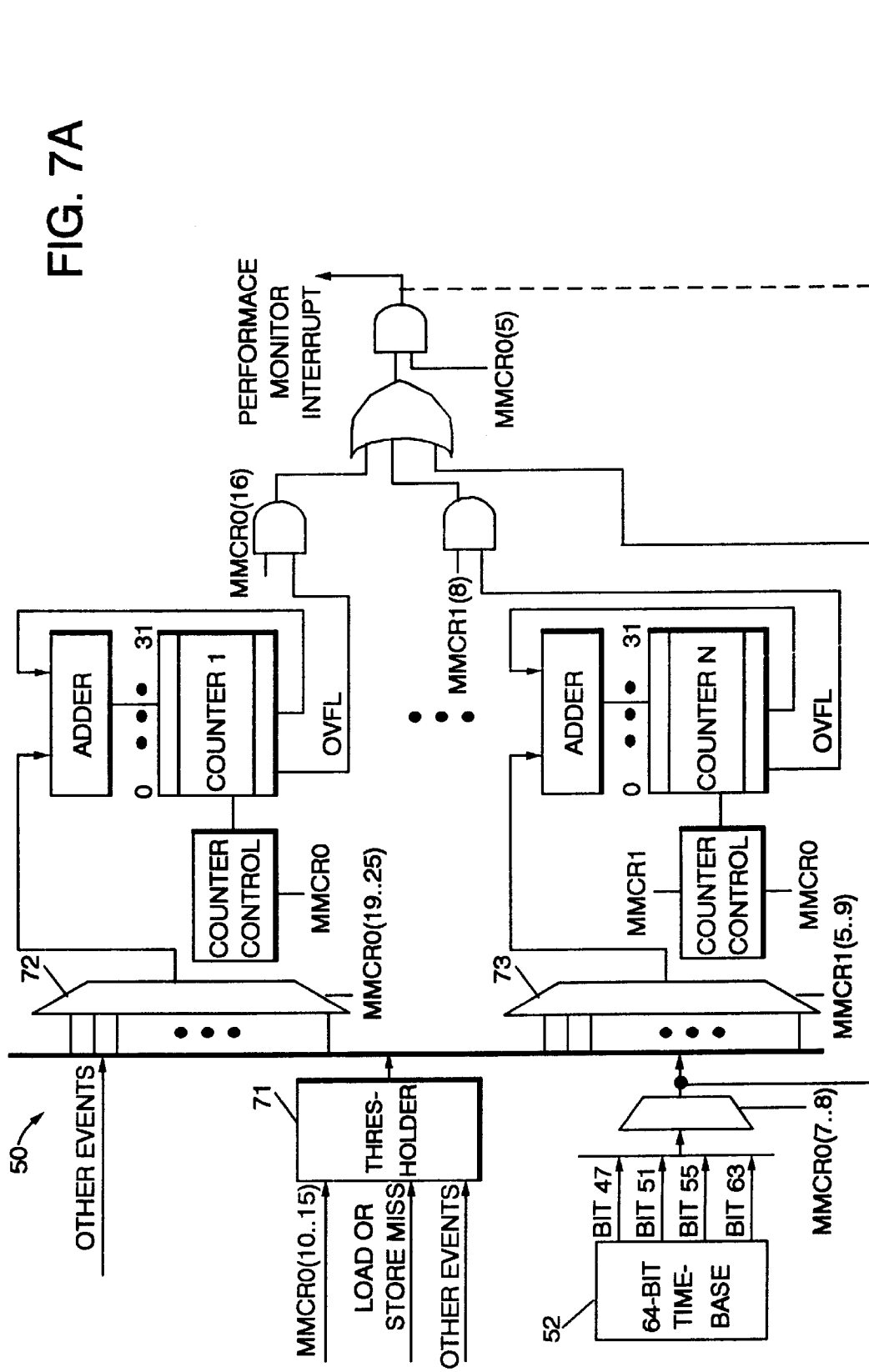
FIGS. 6A and 6B illustrate monitor control registers (MMCRn) utilized to manage a plurality of counters.

In FIG. 6*a*, an example representation of one configuration of MMCR0 suitable for controlling the operation of two PMC counters, e.g., PMC1 and PMC2, is illustrated. As shown in the example, MMCR0 is partitioned into a number of bit fields whose settings select events to be counted, enable performance monitor interrupts, specify the conditions under which counting is enabled, and set a threshold value (X).

The threshold value (X) is both variable and software selectable and its purpose is to allow characterization of certain data, such that by accumulating counts of accesses that exceed decreasing threshold values, designers gain a clearer picture of conflicts. The threshold value (X) is considered exceeded when a decrementer reaches zero before the data instruction completes. Conversely, the threshold value is not considered exceeded if the data instruction completes before the decrementer reaches zero; of course, depending on the data instruction being executed, "completed" has different meanings. For example, for a load instruction, "completed" indicates that the data associated with the instruction was received, while for a "store" instruction, "completed" indicates that the data was successfully written. A user readable counter, e.g., PMC1, suitably increments every time the threshold value is exceeded.

A user may determine the number of times the threshold value is exceeded prior to the signaling of performance monitor interrupt. For example, the user may set initial values for the counters to cause an interrupt on the 100th data miss that exceeds the specified threshold. With the appropriate values, the PM facility is readily suitable for use in identifying system performance problems.

Referring to FIG. 6*a*, as illustrated by this example, bits 0–4 and 18 of the MMCR0 determine the scenarios under which counting is enabled. By way of example, bit 0 is a freeze counting bit (FC). When at a high logic level (FC=1), the values in PMCn counters are not changed by hardware events, i.e., counting is frozen. When bit 0 is at a low logic level (FC=0), the values of the PMCn can be changed by chosen hardware events. Bits 1–4 indicate other specific conditions under which counting is frozen.

For example, bit 1 is a freeze counting while in a supervisor state (FCS) bit, bit 2 is a freeze counting while in a problem state (FCP) bit, bit 3 is a freeze counting while PM=1 (FCPM1) bit, and bit 4 is a freeze counting while PM=0 (FCPM0) bit. PM represents the performance monitor marked bit, bit 29, of a machine state register (MSR) (SPR 40, FIG. 1). For bits 1 and 2, a supervisor or problem state is indicated by the logic level of the PR (privilege) bit of the MSR. The states for freezing counting with these bits are as follows: for bit 1, FCS=1 and PR=0; for bit 2, FCP=1 and PR=1; for bit 3, FCPM1=1 and PM=1; and for bit 4, FCPM0=1 and PM=0. The state for allowing counting with these bits are as for bit 1, FCS=1 and PR=1; for bit 2, FCP=1 and PR=0; for bit 3, FCPM1=1 and PM=0; and for bit 4, FCPM0=1 and PM=1.

Bits 5, 16, and 17 are utilized to control interrupt signals triggered by PMCn. Bits 6–9 are utilized to control the time or event-based transitions. The threshold value (X) is variably set by bits 10–15. Bit 18 control counting enablement for PMCn, n>1, such that when low, counting is enabled, but when high, counting is disabled until bit 0 of PMC1 is high or a performance monitoring exception is signaled. Bits 19–25 are used for event selection, i.e, selection of signals to be counted, for PMC1.

FIG. 6*b* illustrates a configuration of MMCR1 in accordance with an embodiment of the present invention. Bits 0–4 suitably control event selection for PMC3, while bits 5–9 control event selection for PMC4. Similarly, bits 10–14 control event selection for PMC5, bits 15–19 control event selection for PMC6, bits 20–24 control event selection for PMC7, and bits 25–28 control event selection for PMC8.

The counter selection fields, e.g., bits 19–25 and bits 26–31 of MMCR0 and bits 0–28 of MMCR1, preferably have as many bits necessary to specify the full domain of selectable events provided by a particular implementation.

At least one counter is required to capture data for performance analysis. More counters provide for faster and more accurate analysis. If the scenario is strictly repeatable, the same scenario may be executed with different items being selected. If the scenario is not strictly repeatable, then the same scenario may be run with the same item selected multiple times to collect statistical data. The time from the start of the scenario is assumed to be available via system time services so that intervals of time may be used to correlate the different samples and different events.

Referring next to FIG. 7, there is illustrated an embodiment for implementing the present invention. FIG. 7 illustrates performance monitor 50 having a couple of MMCRn registers 51 shown, SIAR and SDAR registers 40, PMCL ... PMCn (noted as Counters 1 ... N) with their associated adders and counter control logic being fed by multiplexer 72 ... 73 controlled by various bits of the MMCRn registers. Multiplexer 72 ... 73 receive events from thresholder 71, time base circuitry 52 and from other events, which are signals originating from various execution units and other units within the microprocessor. All of these various circuit elements of performance monitor 50 are discussed herein and therefore further detailed discussion into the operation of these elements is not provided.

It has been a fairly recent event that the disparity between processor and memory clock speeds has increased. This has required more sophisticated memory subsystems to be developed in order to maximize the memory bandwidth required by current applications. This is especially true for new multimedia applications, which require very high data rates. One of the techniques being used in order to improve memory bandwidth utilization is to use software-directed memory prefetches, identified previously as sdapis. These sdapis are inserted by software and hint to the fetch hardware in the processor where to be fetching from memory. When the data is needed by an application, it will already be in memory (the cache).

The optimal use of the sdapis can dramatically increase the performance of a system by having the needed data always in the cache. But, ineffective uses of the sdapis can cause serious bottlenecks and degrade the performance of a system. Close analysis of the use of the sdapis and gathering of the correct statistical data will help evaluate the usage and thus point to the areas in the code that can use changes/improvements.

Furthermore, the information can be used to improve the processor hardware in future versions.

Bandwidth between the processor and memory is managed by the programmer by the use of cache management instructions. These instructions provide a way for software to communicate to the cache hardware how it should prefetch and prioritize writeback of data. The principal instruction for this purpose is a software-directed cache prefetch instruction called data stream touch (dst), or as above, sdapis.

It should be noted that sdapis are different than mere touch instructions. Touch instructions are instructions that go to memory with an address to retrieve one block of data associated with that address, while sdapis instructions are data stream touch (dst) instructions, which are effectively a plurality of touches, and need to be stopped or given a limit. Such sdapis instructions can be wasteful if not used correctly, primarily by unduly occupying the system bus. Hereinafter, "sdapis" and "dst" will be used interchangeably, and are not to be limited to any particular instruction in a particular processor.

Referring to FIG. 8, a dst instruction specifies a starting address, a block size (1 to N vectors), a number of blocks to prefetch (1 to M blocks), a signed stride in bytes, and a tag that uniquely identifies one of the four possible touch streams. The tag is specified as an immediate field in the instruction opcode. The starting address of the stream is specified in RA (RA≠0, if RA=0 the instruction form is invalid). The block size, number of blocks, and stride are specified in RB. The format of the RB register is shown in FIG. 9.

For the Block_Size, Block_Count, and Block_Stride fields, a value of zero is the largest value, i.e., Block_Size= 0→N vectors, Block_Count=0→M blocks, and Block_ Stride=0→P bytes, meaning there is no way to specify a Block_Size, Block Count, or Block_Stride of zero. Other Block_Sizes, Block_Counts, and Block_Strides correspond exactly to the numerical value of the size, count and stride, e.g Block_Size=11→vector, Block_Size= 22→vectors, and so on. Programmers are discouraged from specifying Block_Strides smaller than 1 block.

The programmer always specifies the Block_Size in terms of vectors regardless of the cache-block size of the machine. The actual size of each block brought into the cache will be the larger of the specified Block_Size or the natural cache-block size of the machine on which the instruction executes. The hardware optimizes the actual number of cache-block fetches made to bring each block of vectors into the cache. The block address of each block in a stream is a function of the starting address of the stream (RA), the Block_Strides (RB), and which block is being fetched. The starting address of the stream may be any arbitrary 32-bit byte address. Each block's address is computed as a full 32-bit byte address from block_addr_n (RA)+n*(RB), where n={0 ... (Block_Count−1)}, and, if (RB)==0 then (RB)←P. The address of the first cache-block fetched in each block is that block's address aligned to the next lower natural cache-block boundary by ignoring $\log_2$ (cache-block—size) 1 sb's (e.g in a 32-byte cache-block machine, the 5 least-significant bits would be ignored). Cache-blocks are then fetched sequentially forward until the entire block of vectors has been brought into the cache before moving on to the next block in the stream.

Execution of this instruction notifies the cache/memory subsystem that the data specified by the dst will soon be needed by the program. Thus, with any excess available bandwidth, the hardware should begin prefetching the specified stream into the cache. To the extent the hardware is successful in getting the data fetched, when the loads requiring the data finally execute, they will find their data in the cache and thus experience only the short latency of a cache hit. In this way, the latency of the memory access can be overlapped with useful work. Execution of a second dst to the tag of a stream already in the progress will cause the existing stream to be aborted (at hardware's earliest convenience) and a new stream established with the same stream tag ID.

The dst instruction is only a hint to hardware. The hardware is free to ignore it, to start the prefetch at it's leisure, to abort the stream at any time, or to prioritize other memory operations over it. Interrupts will not necessarily terminate touch streams, although some implementations may choose to terminate streams on some or all interrupts. Therefore, it is the software's responsibility to stop streams when warranted, for example when switching processes or changing virtual memory context. When a stream is terminated prematurely, the program still works properly, but the loads will not benefit from prefetch and will experience the full latency of a demand miss. Even though these instructions are just hints, they should be considered strong hints.

Therefore, software should avoid using them in highly speculative situations else considerable bandwidth could be wasted. Some implementations may choose not to implement the stream mechanism at all. In this case all stream instructions (dst, dstt, dsts, dss, and dssal) should NOP (a null instruction).

The memory subsystem should consider dst an indication that its stream data will be relatively static (or "persistent") in nature. That is, it is likely to have some reasonable degree of locality and be referenced several times, or over some reasonably long period of time, before the program finishes with it. A variation of the dst instruction, called data stream touch transient (dstt), is provided which is identical to dst but should be considered by the memory system as an indication that its stream data will be relatively transient in nature. That is, it will have poor locality and is likely to be referenced a very few times or over a very short period of time. The memory subsystem can use this persistent/transient knowledge to manage the data as is most appropriate for the specific design of the cache/memory hierarchy of the processor on which the program is executing. An implementation is free to ignore dstt, in which case it should simply be executed as a dst. However, software should always attempt to use the correct form of dst or dstt regardless of whether the intended processor implements dstt or not. In this way the program will automatically benefit when run on processors which do support dstt.

dst will bring a line into the cache subsystem in a state most efficient for subsequent reading of data from it (load). There is a companion instruction called data stream touch for store (dstst) which will bring the line into the cache subsystem in a state most efficient for subsequent writing to it (store). For example, in an MESI cache subsystem, a dst might bring a line in "shared" whereas a dstst would bring the line in "exclusive" to avoid a subsequent demand-driven bus transaction to take ownership of the line so that the write (store) can proceed. The dstst streams are the same physical streams as the dst streams, i.e., the dstst stream tags are aliases of the dst tags. If not implemented, dstst defaults to a dst. If dst is not implement, it is a NOP. There is also a transient version of dstst, called dststt, with the obvious interpretation.

dsi, dstst, dstt, and dststt will perform address translation in the same manner as normal loads. Should a TLB miss occur, a page tablewalk will occur and the page descriptor will be loaded into the TLB. However, unlike normal loads, these instructions never generate an interrupt. If a page fault or protection violation is experienced on a tablewalk, the instruction will not take a DSI; instead, it is simply aborted and ignored.

The dst instructions have a counterpart called data stream stop (dss). Use of this instruction allows the program to stop any given stream prefetch by executing a dss with the tag of the stream it wants to stop. This is useful if, for example, the program wants to start a stream prefetch speculatively, but later determines that the instruction stream went the wrong way. dss provides a mechanism to stop the stream so no more bandwidth is wasted. All active streams may be stopped by using the dssall instruction. This will be useful where, for example, the operating system needs to stop all active streams (e.g. process switch) but has no knowledge of how many streams are in progress.

Referring next to FIG. 10, in order to predict the improvement caused by using sdapis, the following calculation can be made using software in the data processing system: In step 1001, calculate performance without using sdapis (Pwo)=1/(number of cycles the software ran without using sdapis), in step 1002, calculate performance using sdapis (Pw)=1/(number of cycles the software ran using sdapis), and in step 1003, calculate the performance gain=((Pw/Pwo)−1)*100. The number of cycles the software ran without using sdapis is equal to the number of cycles the software ran using sdapis plus the number of memory accesses that hit in the cache due to sdapis times the average cache miss penalty. The number of memory accesses that hit in the cache due to sdapis could be calculated by putting the first address of an sdapis fetch into a register that is then compared against all memory operations.

In order to evaluate sdapis that were essentially useless, the following counts are needed:

number of sdapis that hit in the cache (step 1101);

number of sdapis that hit in the reload table (step 1102; the reload table maintains a list of instructions that have already been dispatched for a load operation);

number of sdapis that hit in any other memory subsystem queue (that can forward data) (step 1103).

The difference between the above events is to determine the magnitude of the missed window in order to determine the level of adjustment needed. Note that any one or more of steps 1101–1103 may be performed in any combination. The counting of these events are typical counts of control signals readily available from their respective arrays. The number of sdapis that hit in the cache can be counted by monitoring the hit signal from the cache and ANDing it with a valid signal for the sdapis. The number of sdapis that hit in the reload table can be similarly counted by monitoring the sdapis valid signal and ANDing it with a hit signal from the reload table. Likewise, the number of sdapis that hit in any other memory subsystem queue can be counted.

Mistimed sdapis can also add memory traffic and thus cause bandwidth degradation. The following events would provide that information:

number of sdapis that load data that is never used (step 1104);

number of sdapis that load data that is cast out before it is used (step 1105).

The number of sdapis that load data that was never used can be counted by having a flag that marks data loaded by sdapis. The bit could be cleared if it is used. Thus, if at the end of a monitoring period, the data has not been used, it can be counted as unused. Furthermore, if this data is being cast out of the cache to make room for more data, it can be counted as sdapis that was cast out before it was used.

Careful attention needs to be paid regarding how the sdapis affect the translation mechanism. Undesirable effects can include stalling (real) tablewalks because an sdapis is doing a tablewalk, or causing so many TLB (translation lookaside buffer) replacements for sdapis that the regular program ends up doing too many tablewalks. Some of the events to monitor these conditions are:

number of sdapis tablewalks (step 1201);

number of cycles doing sdapis tablewalks (step 1202);

number of cycles translation is blocked due to sdapis tablewalk (step 1203);

number of TLB entries that are cast out due to sdapis (step 1204).

To perform these steps, the counters will monitor signals from the TLB that indicate a tablewalk is being performed with signals indicating that a valid sdapis instruction has been issued. Upon castout of data from the TLB, the castout could be qualified with the control signal that indicates the processor is executing a valid sdapis instruction.

Note that any of steps 1201–1204 can be performed by the processor in any combination.

Dispatching a sdapis that arrives "just in time" is the ideal mode of operation. In order to determine this, the following events should be monitored:

number of sdapis misses (step 1301);

number of cycles between the sdapis data loaded and the memory operations that use it (using the threshold capabilities) (step 1302);

number of memory operations that hit on data brought into the cache with a sdapis (step 1303). Note that any one or more of steps 1301–1303 may be performed in any combination.

In order to count the number of cycles between the time an sdapis loaded data and the time that the processor utilized that data, an apparatus similar to a set/reset counter can be used. Whenever an sdapis loads a memory location, a counter is started. When a load occurs, the address is compared to the address that was loaded by the sdapis. When a match happens, the counter is frozen and passed to the monitoring program. This procedure is only one way of accomplishing this account.

In order to count the number of memory operations that hit on data brought in by an sdapis, the processor can mark via a flag all locations that are loaded due to an sdapis. When that data is utilized (via a load to that address), the performance monitor can count (AND of the signal indicating an sdapis-loaded data and a load to that address).

Stopping sdapis in a timely manner becomes important in order to use just the right amount of bandwidth for these operations. The following events should be considered as a basic set:

number of sdapis cancels (step 1401);

number of sdapis cancel alls (step 1402);

number of sdapis suspended due to context change (step 1403);

number of sdapis suspended due to other reasons (step 1404).

The number of sdapis-cancels and sdapis-cancel alls can be counted like any other instruction count (just count the instruction and the fact that it is valid). The number of sdapis that are suspended due to context change or any other reason can also be counted as a result of the cancel control logic that controls the sdapis state machine.

In the case of streaming sdapis, it is important to make considerations about how many streams can be in progress at a time and how effective each stream is. Thus, most of the above should be expanded in the context of each stream as well as keeping track of the number of streams started and in progress at any time.

Pacing is performed by adjusting the values of the performance monitoring counters, that is, by setting the value of the counter high enough so that an exception will be signaled by the occurrence of a particular event. When the performance monitor interrupt is signaled, the value of the sampled instruction address (SIA) should point to the code where this event took place. For example, this could point to some code that issued sdapis to an address that is currently already in the cache, or that fetched addresses that were never used. Thus, a profiling mechanism may be constructed to identify those pieces of code that are causing extra bus traffic or other bottlenecks in the pipeline system.

Please note that the performance monitoring circuitry described previously can be programmed to monitor the signals described with respect to FIGS. 10–14 to permit software in the system to perform the steps in FIGS. 10–14.

Although the present invention and its advantages have been described in detail, it should be understood that various changes, substitutions and alterations can be made herein without departing from the spirit and scope of the invention as defined by the appended claims.

What is claimed is:

1. In a data processing system, determining an improvement in performance of software running on the data processing system by using data stream touch instructions versus not using such data stream touch instructions, comprising the steps of:

counting a number of cycles it takes for the software to run while using the data stream touch instructions;

counting a number of memory accesses that hit in a cache coupled to the data processing system due to the use of the data stream touch instructions;

determining an average cache miss penalty of the data processing system;

calculating a number of cycles it takes for the software to run without using the data stream instructions by multiplying the average cache miss penalty by the number of memory accesses that hit in the cache coupled to the data processing system due to the use of the data stream touch instructions, and then adding a product of this multiplication to the number of cycles it takes for the software to run while using the data stream touch instructions;

calculating the performance of the software while not using the data stream touch instructions by dividing the calculated number of cycles it takes for the software to run without using the data stream instructions into one to produce a value Pwo;

calculating the performance of the software while using the data stream touch instructions by dividing the calculated number of cycles it takes for the software to run while using the data stream instructions into one to produce a value Pw; and calculating a performance gain in the software by using the data stream touch instructions by determining the result of: $((Pw/Pwo)-1)*100$.

2. A data processing system comprising a processor coupled to a memory subsystem that includes a cache memory coupled to the processor, the processor also including performance monitoring circuitry operable for determining an improvement in performance of software running on the data processing system by using data stream touch instructions versus not using such data stream touch instructions, the data processing system further comprising:

performance monitoring circuitry for counting a number of cycles it takes for the software to run while using the data stream touch instructions;

performance monitoring circuitry for counting a number of memory accesses that hit in the cache due to the use of the data stream touch instructions;

circuitry for determining an average cache miss penalty of the data processing system;

circuitry for calculating a number of cycles it takes for the software to run without using the data stream instructions by multiplying the average cache miss penalty by the number of memory accesses that hit in the cache due to the use of the data stream touch instructions, and then adding a product of this multiplication to the number of cycles it takes for the software to run while using the data stream touch instructions;

circuitry for calculating the performance of the software while not using the data stream touch instructions by dividing the calculated number of cycles it takes for the software to run without using the data stream instructions into one to produce a value Pwo;

circuitry for calculating the performance of the software while using the data stream touch instructions by dividing the calculated number of cycles it takes for the software to run while using the data stream instructions into one to produce a value Pw; and circuitry for calculating a performance gain in the software by using the data stream touch instructions by determining the result of: ((Pw/Pwo)−1)*100.

3. The data processing system as recited in claim 2, wherein the data stream touch instructions each specify a starting address of data to retrieve from memory, a block size of the data, and a number of the blocks to retrieve, wherein the number of blocks is greater than one.

4. In a data processing system, a method comprising the steps of:

running a software program that uses data stream touch instructions; and counting a number of the data stream touch instructions that hit in a memory subsystem element.

5. The method as recited in claim 4, wherein the memory subsystem element is a cache.

6. The method as recited in claim 4, wherein the memory subsystem element is a reload table.

7. The method as recited in claim 4, wherein the memory subsystem element is a memory subsystem queue that can forward data to a processor in the method.

8. The method as recited in claim 4, wherein the data stream touch instructions each specify a starting address of data to retrieve from memory, a block size of the data, and a number of the blocks to retrieve, wherein the number of blocks is greater than one.

9. A data processing system comprising a processor coupled to a memory subsystem that includes a cache memory coupled to the processor, the processor also including performance monitoring circuitry, the data processing system further comprising:

circuitry for running a software program that uses data stream touch instructions; and performance monitoring circuitry for counting a number of the data stream touch instructions that hit in a memory subsystem element.

10. The data processing system as recited in claim 9, wherein the memory subsystem element is a cache.

11. The data processing system as recited in claim 9, wherein the memory subsystem element is a reload table.

12. The data processing system as recited in claim 9, wherein the memory subsystem element is a memory subsystem queue that can forward data to the processor in the data processing system.

13. The data processing system as recited in claim 9, wherein the data stream touch instructions each specify a starting address of data to retrieve from memory, a block size of the data, and a number of the blocks to retrieve, wherein the number of blocks is greater than one.

14. In a data processing system, a method comprising the steps of:

running a software program that uses data stream touch instructions; and counting a number of the data stream touch instructions that load data into a cache coupled to a processor in the data processing system that is never used by the processor.

15. The method as recited in claim 14, wherein the data is cast out of the cache before it is used by the processor.

16. The method as recited in claim 14, wherein the data stream touch instructions each specify a starting address of data to retrieve from memory, a block size of the data, and a number of the blocks to retrieve, wherein the number of blocks is greater than one.

17. A data processing system comprising a processor coupled to a memory subsystem that includes a cache memory coupled to the processor, the processor also including performance monitoring circuitry, the data processing system further comprising:

circuitry for running a software program that uses data stream touch instructions; and performance monitoring circuitry for counting a number of the data stream touch instructions that load data into the cache memory that is never used by the processor.

18. The data processing system as recited in claim 17, wherein the data is cast out of the cache before it is used by the processor.

19. The data processing system as recited in claim 17, wherein the data stream touch instructions each specify a starting address of data to retrieve from memory, a block size of the data, and a number of the blocks to retrieve, wherein the number of blocks is greater than one.

20. In a data processing system, a method comprising the steps of:

running a software program that uses data stream touch instructions; and counting signals associated with the data stream touch instructions doing a tablewalk.

21. The method as recited in claim 20, wherein the counting step further comprises the step of:

counting a number of tablewalks caused by the data stream touch instructions.

22. The method as recited in claim 20, wherein the counting step further comprises the step of:

counting a number of cycles during which translations in a translation lookaside buffer ("TLB") are blocked by tablewalks caused by the data stream touch instructions.

23. The method as recited in claim 20, wherein the counting step further comprises the step of:

counting a number of TLB entries that are cast out due to data stream touch instructions in the TLB.

24. The method as recited in claim 20, wherein the data stream touch instructions each specify a starting address of data to retrieve from memory, a block size of the data, and a number of the blocks to retrieve, wherein the number of blocks is greater than one.

25. A data processing system comprising a processor coupled to a memory subsystem that includes a cache memory coupled to the processor, the processor also including performance monitoring circuitry, the data processing system further comprising:

circuitry for running a software program that uses data stream touch instructions; and performance monitoring circuitry for counting signals associated with the data stream touch instructions doing a tablewalk.

26. The data processing system as recited in claim 25, wherein the performance monitoring circuitry further comprises:

performance monitoring circuitry for counting a number of tablewalks caused by the data stream touch instructions.

27. The data processing system as recited in claim 25, wherein the performance monitoring circuitry further comprises:

performance monitoring circuitry for counting a number of cycles during which translations in the TLB are blocked by tablewalks caused by the data stream touch instructions.

28. The data processing system as recited in claim 25, wherein the performance monitoring circuitry further comprises:

performance monitoring circuitry for counting a number of TLB entries that are cast out due to data stream touch instructions in the TLB.

29. The data processing system as recited in claim 25, wherein the data stream touch instructions each specify a starting address of data to retrieve from memory, a block size of the data, and a number of the blocks to retrieve, wherein the number of blocks is greater than one.

30. In a data processing system, a method comprising the steps of:

counting a number of data stream touch instruction misses; and counting a number of cycles between when data is loaded into a cache and when a subsequent memory operation uses that data.

31. The method as recited in claim 30, further comprising the step of:

counting a number of memory operations that hit on data retrieved into the cache by data stream touch instructions.

32. The method as recited in claim 31, wherein the data stream touch instructions each specify a starting address of data to retrieve from memory, a block size of the data, and a number of the blocks to retrieve, wherein the number of blocks is greater than one.

33. A data processing system comprising a processor coupled to a memory subsystem that includes a cache memory coupled to the processor, the processor also including performance monitoring circuitry, the data processing system further comprising:

performance monitoring circuitry for counting a number of data stream touch instruction misses; and performance monitoring circuitry for counting a number of cycles between when data is loaded into a cache and when a subsequent memory operation uses that data.

34. The data processing system as recited in claim 33, further comprising:

performance monitoring circuitry for counting a number of memory operations that hit on data retrieved into the cache by data stream touch instructions.

35. The data processing system as recited in claim 34, wherein the data stream touch instructions each specify a starting address of data to retrieve from memory, a block size of the data, and a number of the blocks to retrieve, wherein the number of blocks is greater than one.

36. In a data processing system, a method comprising the steps of:

running a software program that uses data stream touch instructions; and counting signals associated with canceling one or more of the data stream touch instructions.

37. The method as recited in claim 36, wherein the data stream touch instructions each specify a starting address of data to retrieve from memory, a block size of the data, and a number of the blocks to retrieve, wherein the number of blocks is greater than one.

38. A data processing system comprising a processor coupled to a memory subsystem that includes a cache memory coupled to the processor, the processor also including performance monitoring circuitry, the data processing system further comprising:

circuitry for running a software program that uses data stream touch instructions; and performance monitoring circuitry for counting signals associated with canceling one or more of the data stream touch instructions.

39. The data processing system as recited in claim 38, wherein the data stream touch instructions each specify a starting address of data to retrieve from memory, a block size of the data, and a number of the blocks to retrieve, wherein the number of blocks is greater than one.

* * * * *